United States Patent

Metcalf

[15] 3,659,086

[45] Apr. 25, 1972

[54] REPETITIVE SAMPLING WEIGHTED FUNCTION CONVERTER

[72] Inventor: Eric Metcalf, Farnborough, England

[73] Assignee: The Solartron Electronic Group Limited, Farnborough, England

[22] Filed: June 8, 1970

[21] Appl. No.: 44,078

[30] Foreign Application Priority Data

June 11, 1969 Great Britain ......................29,593/69

[52] U.S. Cl. ........................235/150.51, 235/164, 235/183, 340/347 AD, 340/347 SH, 328/151

[51] Int. Cl. ....................................H03k 13/04, G06f 7/50

[58] Field of Search .................235/181, 183, 160, 164, 175; 340/347 AD, 347 SH; 333/18; 328/151

[56] References Cited

UNITED STATES PATENTS

| | | | |
|---|---|---|---|
| 2,950,053 | 8/1960 | Hirsch | 235/183 |
| 3,303,335 | 2/1967 | Pryor | 235/181 |
| 3,543,009 | 11/1970 | Voelcker | 235/181 X |
| 3,276,012 | 9/1966 | Secretan | 340/347 |
| 3,446,299 | 5/1969 | Leonowicz | 235/183 X |
| 2,864,948 | 12/1958 | Neff | 235/164 X |
| 3,292,110 | 12/1966 | Becker et al. | 333/18 |
| 3,297,951 | 1/1967 | Blasbalg | 333/18 |
| 3,500,026 | 3/1970 | Pokorny | 235/160 |

OTHER PUBLICATIONS

Hoeschele: Analog to Digital/D to A Conversion Techniques Textbook, pages 358–360 Aug. 1968

*Primary Examiner*—Felix D. Gruber
*Attorney*—William R. Sherman, Stewart F. Moore, Jerry M. Presson and Roylance, Abrams, Kruger, Berdo and Kaul

[57] ABSTRACT

An electrical signal is sampled repeatedly and the samples are integrated in analog or digital form to effect active filtering of the signal. Preferably the samples are weighted differently or the inter-sample interval is varied in accordance with a weighting function chosen to improve noise rejection at one or more frequencies.

3 Claims, 3 Drawing Figures

REPETITIVE SAMPLING WEIGHTED FUNCTION CONVERTER

This invention relates generally to sampling measurements particularly, but not exclusively, as employed in conjunction with analog to digital converters such as digital voltmeters and other digital measuring instruments in which a signal is sampled to obtain a digital measure thereof. It is already known that if such an instrument is caused to take two samples spaced by an interval T there is theoretically infinite rejection of noise contaminating the DC signal at a frequency ½T and odd harmonics thereof. This technique can be used to eliminate 50 Hz. mains hum for example by spacing the samples by 10 ms.

This invention concerns an extension of sampling techniques which, it will be shown, enables (among other things) enhanced accuracy to be obtained from a very simple and cheap analog to digital converter and also allows much greater flexibility in design for rejecting one or more noise frequencies.

According to the present invention there is provided a circuit comprising means adapted to sample an electrical input signal repeatedly to take at least 10 successive samples with predetermined intervals therebetween and means for integrating the samples cumulatively.

The samples can remain as analog signals, being integrated in this form, e.g. by applying the samples to a capacitor or a more complex integrating circuit. The first said means can, however, be an analog to digital converter which provides a digital measure of each sample, the digital values being accumulated to effect the cumulative integration.

In the simplest form of the invention, taking ten, or a hundred, or even more equally spaced samples, the effect achieved is akin to that of repeated laboratory measurements, whereby random errors in the measurement are substantially reduced. Looked at another way the repeated sampling simulates integration of the input signal over the whole measurement period, which can be made equal to the reciprocal of the predominant noise frequency to obtain noise rejection in the manner characteristic of integrating analog to digital converters. Thus the invention enables the best possible use to be made of a simple analog to digital converter, such as is described below. Although the inherent sensitivity and accuracy of such an analog to digital converter may be substantially less than the sensitivity and accuracy of a sophisticated integrating type analog to digital converter, the cheapness of the system will make it attractive for many uses and it will be worthwhile providing an input amplifier to increase sensitivity and arranging for automatic, periodic calibration against a reference input (in the manner well known in relation to DC amplifiers used for multi-position data sampling) in order to obtain increased accuracy.

The invention is not limited to the simple application so far described, however. The specification of our co-pending application Ser. No. 29432/69, U.S. application, Ser. No. 44,077, filed June 8, 1970, is concerned with varying the weight with which a signal is integrated over a measurement period and that specification describes how improved noise rejection can be achieved by, for example, integrating with weight unity in intervals $-2T<t' \leq -3T/2$ and $-T/2<t' \leq 0$ where time $t'$ is measured from $t' = 0$ at the end of the measurement period (which is of duration 2T), and integrating with weight three during the interval $-3T/2<t' \leq -T/2$. This is only one of many advantageous weighting schedules which can readily be simulated by means of the present invention.

Thus, in an important development of the invention, the weight with which the samples are integrated cumulatively is different for different ones of the samples and/or the samples are taken at different predetermined intervals.

Although the invention is particularly useful in the field of analog to digital conversion, in its broadest aspect it permits active filtering of an analog signal to reject unwanted components thereof and select coherent components corresponding to the weighting schedule adopted.

Two embodiments of the invention will now be described, by way of example, with reference to the accompanying drawings. These embodiments simulate the specific weighting schedule described above; no embodiment is described for taking equally spaced, equally weighted samples as this is an obvious simplification of the embodiments which are described. For simplicity the number of samples is taken to be 12. In practice a larger number is preferred, say 100 or even 1,000.

IN THE DRAWINGS

Figure 1:
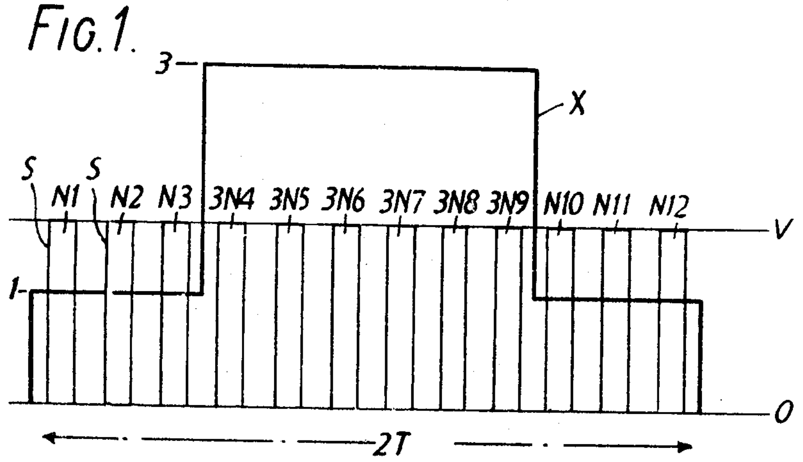
FIG. 1 is an explanatory diagram.
Figure 2:
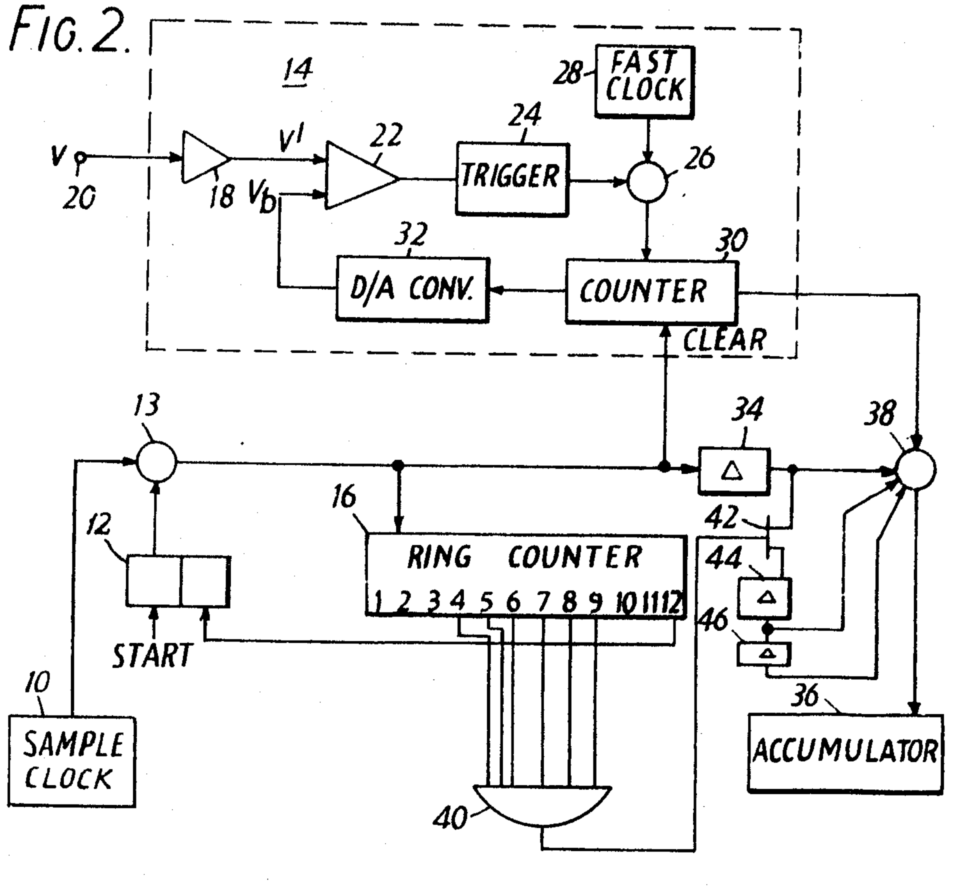
FIG. 2 is a block diagram of one embodiment of the invention.

FIG. 1 illustrates a DC signal V sampled 12 times at positions S to produce numbers of pulses $N_1$ to $N_{12}$. If these pulses are counted cumulatively but with $N_4$ to $N_9$ multiplied by 3, the cumulative count approximates to the value which would be obtained by integrating V over the total sampling period 2T with V (or the continuously developed integral) multiplied by a weighting function X. As noted above, the practical value of such integration is explained in our aforementioned specification. The analog to digital converter system shown in FIG. 2 is designed to carry this sampling procedure into effect.

The samples are taken at intervals established by a clock source 10 of period $t$. $12t = 2T$ and $12t$ is made equal to or an integral multiple of the period of a noise signal known to be present in the input V. When a measurement is to be made a start bistable 12 is set to open a gate 13 to pass clock pulses from the source 10 to an analog to digital converter 14 and to a 12-stage ring counter 16 which sequences the sampling operations. The 12th output of the ring counter resets the bistable 12 to terminate the measurement.

The analog to digital converter 14 comprises an input amplifier 18 connected to an input terminal 20 for receiving input voltage V. The amplifier 18 feeds a voltage V' to one input of a differential amplifier 22. When the output of the amplifier 22 goes negative a trigger circuit 24 is set to open a gate 26 and allow fast clock pulses from a source 28 into a counter 30. The number in the counter is converted to a feedback voltage $V_b$, applied to the other input of the amplifier 22, by a digital to analog converter 32, e.g. of the switched resistor tree type. To take a sample of V all that is necessary is to clear the counter 30, and this is done by each sampling pulse which passes through the gate 13. The trigger circuit 24 immediately sets and fast pulses pass through the gate. The counter 30 runs up rapidly to the number $N_i$ which causes $V_b$ to counterbalance V' exactly ($i = 1$ to 12).

This form of analog to digital converter is well known per se and can be constructed very cheaply using mainly integrated circuits with thin film resistors for the digital to analog converter 32.

After a suitable delay, provided by a delay circuit 34, each sampling pulse passed by the gate 13 causes the number $N_i$ in the counter 30 to be added into an accumulator 36, without however clearing the counter 30 (this only being done in direct response to a sampling pulse). The techniques for effecting this addition are well known in the digital computer art. The symbolical representation of a gate 38 opened by the delayed sampling pulse is used here.

When the ring counter is in states 4 to 9 a signal is obtained from an OR gate 40 which signal is used to cause $N_i$ ($i = 4$ to 9) to be added into the accumulator 36 3 times, instead of one. Thus the output of the gate 40 closes a transistor switch 42 which applies the output of the delay circuit 34 to two further cascaded delay circuits 44 and 46, both of whose outputs are applied to open the gate 38.

The final number in the accumulator is N multiplied by $(3 + 3 \times 6 + 3) = 24N$ where $N$ is the required mean value of the measurement. The effect of the repeated sampling with differing weights is merely that of introducing a linear scaling factor, so far as a DC input is concerned. It is, therefore, readily possible to arrange that the number actually registered in the accumulator 36 gives a direct reading of V (e.g., by suitable scaling in the digital to analog converter 32).

Figure 3:
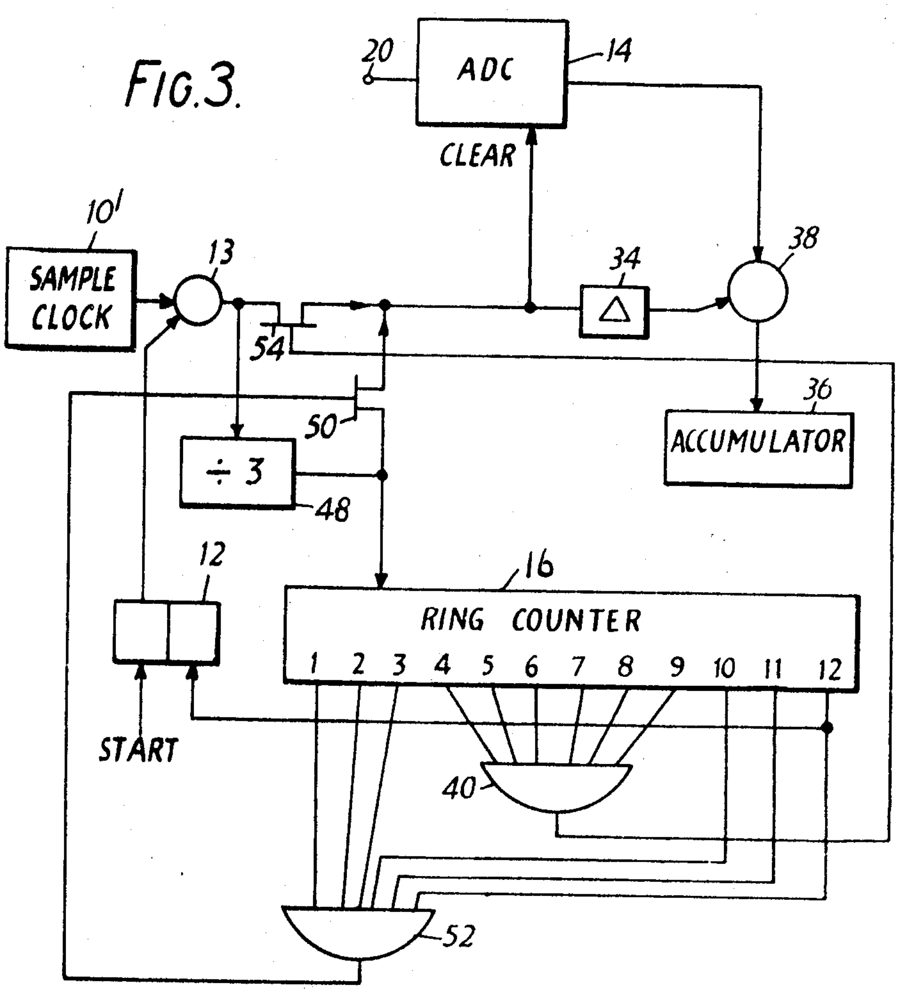
FIG. 3 is a block diagram of another embodiment.

It is not necessary for the samples to be equally spaced and indeed varying the spacing of the samples gives an alternative method of varying the weighting in accordance with the function X. This possibility is illustrated in FIG. 3 in which the analog to digital converter 14 is exactly as in FIG. 2. The sample clock source 10' now runs at three times the frequency of the source 10 in FIG. 2. The output of the gate 13 however is applied to a divide-by-three circuit 48 whose output feeds the ring counter 16. In states 1, 2, 3, 10, 11 and 12 of the counter 16 a switch 50 is closed through an OR gate 52 to utilize the output of the divide-by-3 circuit 48 as the sampling pulses, which clear the counter in the analog to digital converter 14 and pass through the delay circuit 34 to open the gate 38. (The additional delay circuits 44 and 46 are no longer needed.)

In contrast, in states 4 to 9 the undivided output of the gate 13 is used as the sampling pulses, whereby three samples are taken in each of these states. To this end the output of the OR gate 40 now closes a switch 54 instead of the switch 50.

The invention enables a low resolution analog-to digital converter to be used to measure to higher resolution. If the basic resolution is 1 in M and $N$ measurements are taken, the final resolution is, by a well known statistical result, 1 in $\sqrt{N \cdot M}$ provided of course the converter is accurate to 1 part in $\sqrt{N \cdot M}$. (The invention will only reduce statistical errors; it cannot reduce a systematic error.) It is obvious that the above situation implies that the analog signal includes a random component, otherwise a low resolution converter will merely lead to a rounding error. If, however, the signal should be virtually free from noise, the invention can still be employed simply by adding noise to the signal, e.g. a random or pseudorandom signal or a periodic signal with a period equal to an integral fraction of the measurement period. The probability distribution of the amplitudes of the added signal should be flat for all amplitudes between the peak amplitudes; suitable signals are triangular or sawtooth waveforms.

I claim:

1. Apparatus comprising means for receiving an input analog signal;

a sample clock for producing pulses;

converter means responsive to each pulse produced by said sample clock to repetitively sample said input analog signal and to produce a sequence of digital output signals representative of said samples;

first counter means for counting the number of pulses produced by said sample clock and for generating a signal terminating the sequential sampling of said input signal at a preselected count;

means for accumulating the sequence from digital outputs of said converter means; and logic circuit means for supplying preselected ones of said sequence of digital output signals to said means for accumulating more than once to effect multiplication thereof, the choice of said preselected ones of said sequence and of the effective multiplication constituting a weighting function chosen to improve rejection of specific noise characteristics.

2. Apparatus according to claim 1 wherein said converter means comprises an A/D converter including a second counter means for holding the digital output of said converter, and said logic circuit means includes gate circuit means responsive to selected states of said counter means for supplying the output of said second counter means to said accumulator a predetermined number of times.

3. An analog to digital converter for converting an analog signal, which can include an undesirable noise signal of period T, to a corresponding digital output signal, comprising the combination of conversion means for converting the analog signal to an intermediate digital signal;

timing means for causing said conversion means to produce at least 10 uniformly temporally spaced intermediate digital signals in each interval of time $n$T, where $n$ is an integer;

means for accumulating said intermediate digital signals to integrate them over the interval $n$T; and means for altering the scaling of the values of selected ones of said intermediate digital signals by predetermined factors to substantially reject the undesirable noise signal.

* * * * *